United States Patent
Xiong et al.

(10) Patent No.: US 7,342,900 B2
(45) Date of Patent: Mar. 11, 2008

(54) APPARATUS AND METHOD FOR ESTIMATING DEVICE AVAILABILITY

(75) Inventors: Yuhong Xiong, Fremont, CA (US); Xiaofan Lin, Sunnyvale, CA (US); James A Rowson, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 10/849,999

(22) Filed: May 19, 2004

(65) Prior Publication Data

US 2005/0259607 A1 Nov. 24, 2005

(51) Int. Cl.
*H04L 1/00* (2006.01)
(52) U.S. Cl. .................................... 370/328
(58) Field of Classification Search ............. None
See application file for complete search history.

(56) References Cited

U.S. PATENT DOCUMENTS 5,790,431 A * 8/1998 Ahrens et al. ............. 718/104
6,003,090 A * 12/1999 Puranik et al. ............ 709/235

OTHER PUBLICATIONS

Xiong et al, Estimating Device Availability in Pervasive Peer-to-Peer Environment, IEEE, pp. 1-7, 2004.*

"Availability Modeling and Validation Methodology for RS/6000 Systems," Ahrens and Chandra, 1999 IEEE Proceedings Annual Reliability and Maintainability Symposium, 1999.

"High-Availability Transaction Processing: Practical Experience in Availability Modeling and Analysis," Bowles and Dobbins, 1998 IEEE Proceedings Annual Reliability and Maintainability Symposium, 1998.

"Automatic Service Availability Management," Flaviu Cristian, IEEE International Symposium on Autonomous Decentralized Systems, Kawasaki, Japan, Mar.-Apr. 1993.

"Using a Distributed Snapshot Algorithm in Wireless Sensor Networks," da Silva et al., Proceedings of the Ninth IEEE Worksop on Future Trends of Distributed Computing Systems, 2003.

* cited by examiner

Primary Examiner—Frank Duong

(57) ABSTRACT

A method and apparatus for estimating device availability in a pervasive peer to peer environment is presented. The method and apparatus include a linear estimation approach and a bin estimation approach, where the bin estimation approach may include enhanced bin estimation or adaptive bin estimation. A central node queries available contacted devices and builds a history of times and availability indications for the contacted device, and subsequently computes an availability probability curve based on assumptions regarding the availability indications and the time since the last received availability indication.

29 Claims, 8 Drawing Sheets

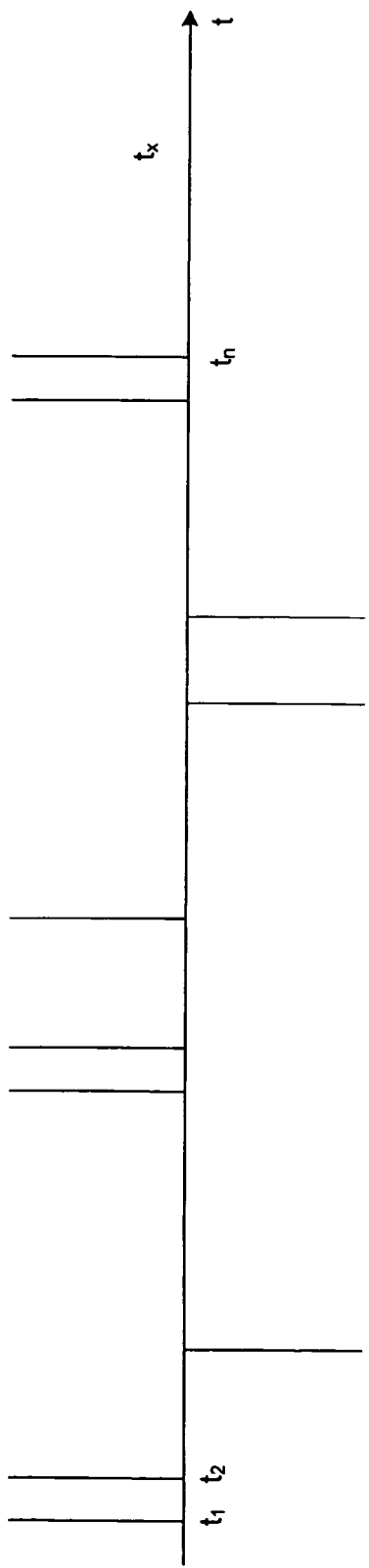
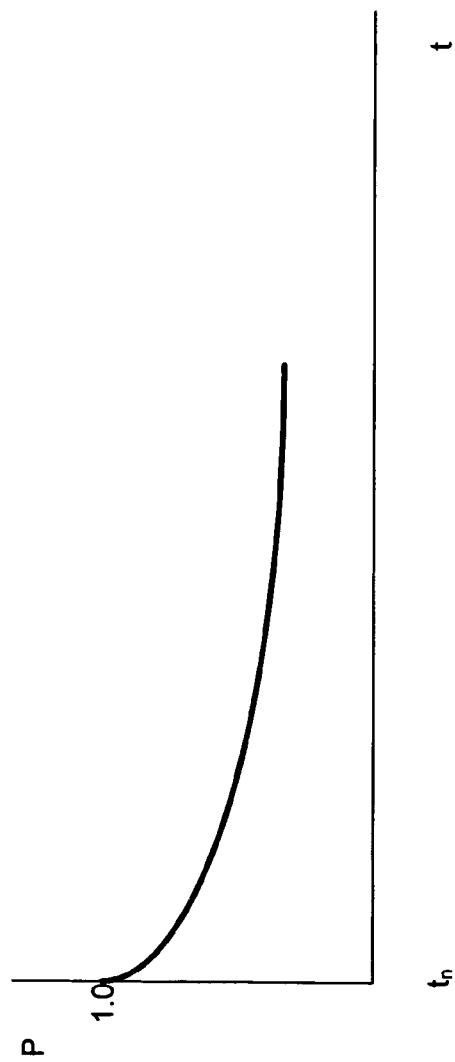

| Bin No | 1 | 2 |
|---|---|---|
| Bin Interval | 1-3 | 4-6 |
| Up Sample Count | 1 | 2 |
| Down Sample Count | 2 | 3 |

Following
Up Sample

| Bin No | 1 | 2 |
|---|---|---|
| Bin Interval | 1-3 | 4-6 |
| Up Sample Count | 5 | 0 |
| Down Sample Count | 0 | 0 |

Following
Down Sample

APPARATUS AND METHOD FOR ESTIMATING DEVICE AVAILABILITY

BACKGROUND OF THE INVENTION

1. Field of the Invention

The present invention relates generally to the field of estimating device availability, and more specifically to estimating device availability in a pervasive peer-to-peer environment.

2. Description of the Related Art

In a pervasive computing environment, vast numbers of computing devices can collaborate to provide computing services to users. These devices span the full spectrum from powerful servers to tiny battery-powered embedded gadgets, and can include specialized tiny wireless sensors for tracking human activity, customized remote controls, PDAs, wireless phones, digital cameras, picture frames, large screen displays, and general purpose computers such as laptops and servers. Communication channels for these devices range from multi-gigabit backbones to low bandwidth wireless connections. Since many devices are mobile, and are regularly deactivated to conserve power, the communication topology is very dynamic. In other words, communication channels between devices can change rapidly in a typical environment. As a result of this heterogeneity and dynamism, devices often communicate in an ad-hoc, peer-to-peer manner. For example, a palm device may communicate wirelessly to a laptop computer, and via a wired connection to a desktop computer.

A particularly beneficial aspect of a multiple device, pervasive peer-to-peer environment is the ability to rely on other resources as rapidly as possible, or to share processing between devices. Such sharing of resources can enable faster processing and more efficient throughput for all devices in the arrangement. If devices in the peer-to-peer arrangement do not have information regarding the availability of other devices, each device cannot effectively or efficiently use other devices. For example, an active PDA having wireless capability cannot utilize the resources of a nearby active desktop computer having wireless capability if the PDA does not have information regarding the desktop.

Currently available devices generally do not provide indications on the availability of other devices. Since a pervasive peer-to-peer environment does not rely on a central server to coordinate or monitor communications or connections, individual devices are limited in locating other devices that are or may be available, and may have an ad-hoc set of information regarding availability of nearby or available devices.

One way of assessing device availability is to regularly probe the other devices, or to probe the target device before initiating useful communication. This alternative has two disadvantages. First, if most of the devices are not available to a certain node, that node may spend too much time and too many resources probing potential target devices before finding an accessible device, and thus reduce system performance. In slow networks, the amount of time spent may not provide acceptable levels of performance. Second, probing consumes a non-insignificant quantity of communication resources, which again may reduce system performance.

Another alternative is to maintain device compatibility or availability on a central server and provide the information at regular intervals to the nodes. As may be appreciated, this requires significant bandwidth and depending on the time for obtaining and transmitting updated availability information, may provide outdated information to the nodes, which is generally unacceptable. Further, when maintaining availability information on a central server, the server and a client node may not have access to the same communication interface. For example, if a central server can reach a node A through a wired connection, another node B, having only a wireless connection, may not be able to reach A. So information maintained on the central server about A's availability may be misleading to B.

Also, the need for network traffic tends to decrease battery life in small devices, and is therefore generally undesirable. Any system that minimizes contact between devices can extend battery life in certain devices and can enhance the overall capability of the entire device network.

Based on the foregoing, it would be advantageous to offer an arrangement enabling devices in a pervasive peer-to-peer environment in order to assess the availability of other devices in the environment.

SUMMARY OF THE INVENTION

According to a first aspect of the present invention, there is provided a method for an invoking device to estimate contacted device availability in a pervasive peer-to-peer environment. The method comprises observing a number of attempts by the invoking device to contact the contacted device and recording availability of the contacted device for each attempt as an availability indication for a time associated with the attempt, extrapolating at least one availability indication to at least one on period, computing a probability curve based on the extrapolated on period, and estimating whether the contacted device has availability using the probability curve.

According to a second aspect of the present invention, there is provided a method for an invoking device to estimate contacted device availability in a pervasive peer-to-peer environment. The method comprises observing a number of attempts by the invoking device to contact the contacted device and recording availability of the contacted device for each attempt as an availability indication for a time associated with the attempt, establishing a number of time bins, each time bin representing a range of time quantities between attempts by the invoking device to contact the contacted device, setting a number of availability indications into each time bin based on separation in time between attempts and whether the contacted device was available or unavailable, and establishing contacted device availability by correlating time since a last availability was received with an appropriate time bin and a ratio between available and unavailable indications within the appropriate time bin.

According to a third aspect of the present invention, there is provided a device for estimating contacted device availability in a pervasive peer-to-peer environment. The device comprises a transmitter configured to transmit a request for availability from the contacted device, a receiver receiving an availability indication for the contacted device, a storage mechanism for storing each time and each availability indication from the receiver, wherein a plurality of availability indications and associated times form an availability history, a processor for querying the storage mechanism for the availability history, a computing module capable of computing an availability probability curve based on the availability history, and an availability determination module able to apply the current time to the availability probability curve to assess the availability of the contacted device.

According to a fourth aspect of the present invention, there is provided a method for an invoking device to adaptively estimate contacted device availability in a pervasive peer-to-peer environment. The method comprises observing a number of attempts by the invoking device to contact the contacted device and recording availability of the contacted device for each attempt as an availability indication for a time associated with the attempt, establishing a number of time bins, each time bin representing a range of time quantities between attempts by the invoking device to contact the contacted device, setting a number of availability indications into each time bin based on separation in time between attempts and whether the contacted device was available or unavailable, wherein the setting comprises balancing the number of time bins with the number of availability indications in each bin, and establishing contacted device availability by correlating time since a last availability was received with an appropriate time bin and a ratio between available and unavailable indications within the appropriate time bin.

These and other objects and advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which:

FIG. 1A illustrates a sequence of indications representing times that a invoking device queries a contacted device and the results of those queries;

FIG. 1B illustrates the probabilities, at all the time points after $t_n$, forming a probability curve or availability probability curve P(t);

DETAILED DESCRIPTION OF THE INVENTION

Figure 2:
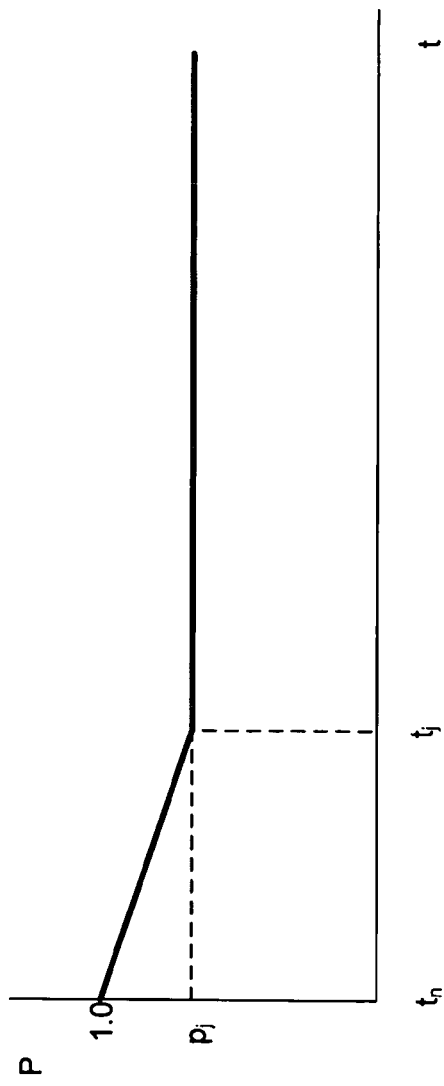
FIG. 2 contacted device illustrates an example availability probability curve where the last sample received at time $t_n$ is up, indicating the contacted device was active.

The present design operates by providing information about the availability of other devices to each device in a pervasive peer-to-peer environment without using a central computer. Two algorithms are presented for predicting the availability of other devices using historic availability data for those other devices obtained during routine usage. Each device separately maintains data about past communication with the other devices, and predicts current and future availability for those devices using statistics from the data obtained. The first algorithm operates by assuming a simple linear model of device behavior. The second algorithm does not use models, but instead employs bin-based segmentation.

As used herein, the term "invoking device" or "node device" means the device or apparatus operating or running the algorithm, as differentiated from a "contacted device," which the node device may use or contact if the contacted device is available.

Also, as used herein, device availability is described as being maintained at the device level. Device availability information may be maintained elsewhere, such as at the interface level. For example, if a device has multiple IP (internet protocol) addresses and a few wireless interfaces (such as infra-red and Bluetooth), the overall system architecture can maintain availability information separately for different interfaces, as some of the interfaces may not be available at certain time, or to a certain device. Thus, as used herein, the terms "availability" and "status" used in reference to a device are meant broadly, and may include device availability or status over a particular interface or channel.

Simple Linear Model

The simple linear model algorithm assumes that a device's status is binary at any time, that is, a device is either available or not available. Given a sequence of historic communication result, or samples at time points $t_1, t_2, \ldots t_n$, the algorithm seeks to predict the availability of that device at a time point $t_x > t_n$, in the form of the probability that the device is available at time $t_x$. FIG. 1A illustrates a sequence of indications, representing times that the invoking device queries the contacted device, and an indication whether the contacted device is available at that query time. An upward line, or up sample, indicates the contacted device is available, while a downward line, or down sample, indicates the contacted device is queried and is not available. The probabilities at all the time points after $t_n$ form a probability curve P(t), as shown in FIG. 1B. In FIG. 1B, the time origin of the curve is $t_n$, the time of the last query of the contacted device by the invoking device.

From FIG. 1A, a down sample does not necessarily mean that the device is actually down. The device may be fully operational, but the communication link between the invoking device and the contacted device may be down. As shown in FIG. 1A, the samples may not be uniformly spaced, which makes the time sequences in question different from the traditional Markov or other discrete stochastic processes. The first phase of the algorithm is to obtain a plurality of samples of contacted device availability.

The system may allow for a non-binary state. For example, the observed samples may be classified as fast, slow, and not available, to distinguish the different speeds of the contacted device and the communication link.

From the foregoing, it may be appreciated that historic data is typically collected through routine device usage. Collecting historic data tends to minimize the overhead of contacting other devices simply to obtain availability information, and thus regular polling is not performed and the samples shown in FIG. 1A are unevenly distributed.

If the estimation time $t_x$ is very close to the time of the last observed sample $t_n$ in FIG. 1A, the probability that the contacted device has not changed state is very high. As reflected in FIG. 1B, as time passes by, the probability that the contacted device has not changed state decreases. On the other hand, if $t_x$ is significantly removed in time from $t_n$, the probability that the device is available at $t_x$ is less correlated with its state at $t_n$, and as shown in FIG. 1B, has a tendency to remain relatively stable over time. The value of this probability reflects its long-term average behavior. Availability can therefore be considered as shown in FIG. 2. The slanted segment models the gradual decrease of the probability that the device is in the same state as $t_n$, and the flat segment represents the availability estimate over the long term.

Figure 3:
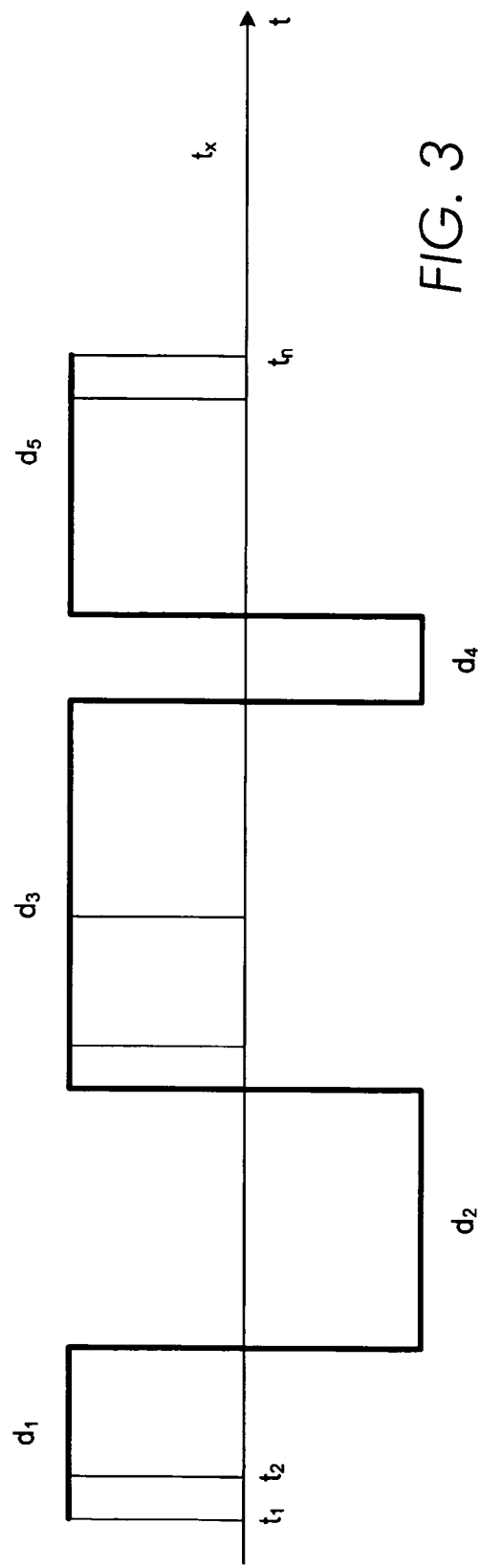
FIG. 3 contacted device represents the assumption of availability for the contacted device in accordance with the availability sequence of FIG. 1A.

This algorithm locates the position of the junction point J, ($p_j$, $t_j$). In FIG. 2, $p_j$ is the long term probability that the contacted device is available, and $t_j$ is a threshold after which the state of the device is not considered to be directly related to the last sample, or becomes stale. The algorithm estimates $p_j$ and $t_j$. $p_j$ can be estimated as the percentage of time the device is available during the entire sampling period between $t_l$ and $t_n$. The algorithm estimates $t_j$ as the time the device will remain available given the last known state also remains available. Since actual device behavior at all time points is unknown, the system makes assumptions based on the discrete samples available. As a first order approximation, the system assumes that the contacted device holds its state as observed in a sample until the time of the next sample. If a sample is up, the contacted device is presumed available until the next sample, and if the sample is down, the contacted device is presumed unavailable until the invoking device takes another sample. As shown in FIG. 3, the invoking device uses a square waveform to approximate the machine state. The invoking device uses the following formulas to compute $p_j$ and $t_j$:

$$p_j = \frac{\text{total up time}}{\text{total observe time}} \quad (1)$$

$$= \frac{d_1 + d_3 + d_5}{d_1 + d_2 + d_3 + d_4 + d_5} \quad (2)$$

$$t_j = 0.5 * (\text{average up time}) \quad (3)$$

$$= 0.5 * \frac{d_1 + d_3 + d_5}{3} \quad (4)$$

FIG. 3 illustrates an example case where the last sample is up. If the last sample is down, the curve shown in FIG. 3 will begin at zero on the vertical axis, rise to the corresponding $p_j$, and level off.

Figure 4:
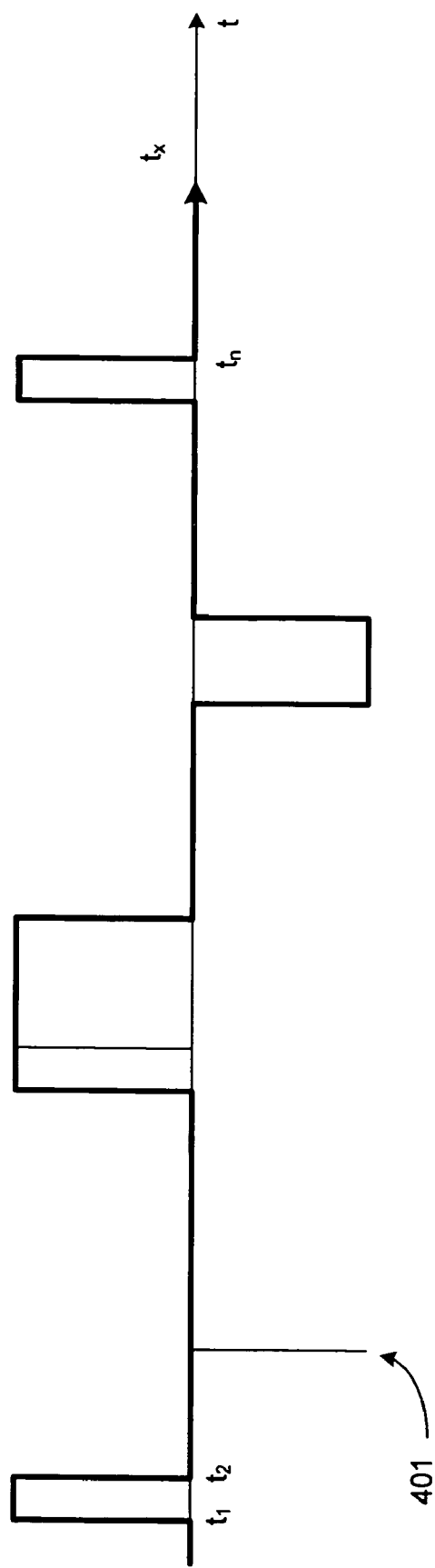
FIG. 4 is an alternate embodiment comprising dormant periods.

Other similar computational methods may be employed. For example, when observing a history of up indications and down indications, the system may assume that successive active indications, or up samples, indicate the time period when the contacted device was active, while successive down samples indicate a full period where the contacted device was inactive, while single indications or periods between time are undetermined, Such an arrangement is shown in FIG. 4, where only up periods and down periods are used for estimates. Note that point 401 provides a single negative or inactive period between two active indications. According to this alternate implementation, this indication would carry no weight, which in certain instances may be a disadvantage. For example, if a contacted device is on for much of the time but off only periodically, the invoking device may only have single down samples between multiple up samples, and the result may be to ignore too many down sample indications.

Figure 5:
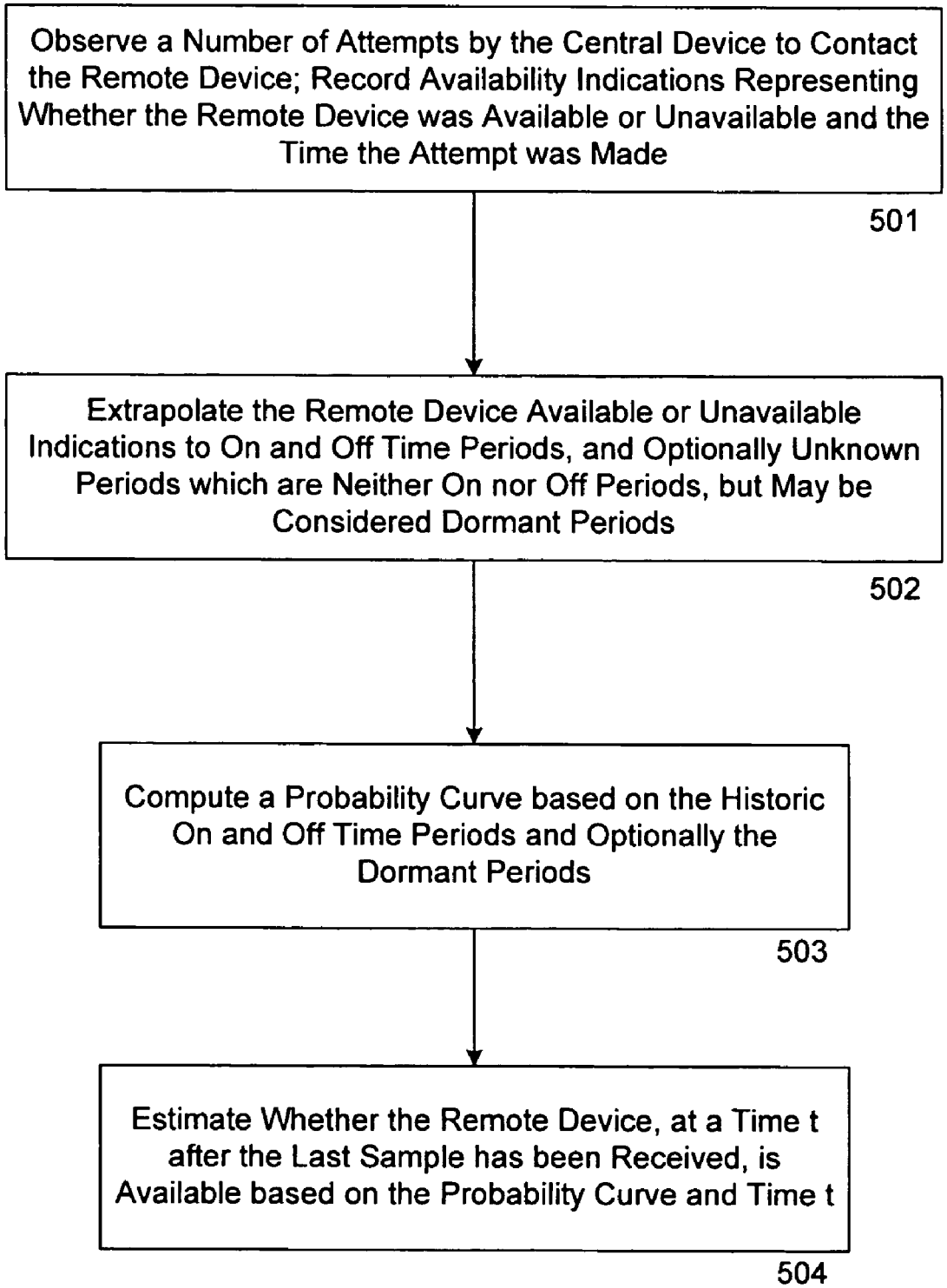
FIG. 5 is a flowchart illustrating operation of the linear estimation embodiment of the present design.

In short, the present simple linear model performs according to the embodiment shown in FIG. 5. From FIG. 5, point 501 requires observing a number of attempts by the invoking device to contact the contacted device, and recording availability indications representing whether the contacted device was available or unavailable and the time the attempt was made. Point 502 extrapolates the contacted device available or unavailable indications to on and off time periods, and optionally unknown periods which are neither on nor off periods, but may be considered dormant periods. Point 503 computes a probability curve based on the historic on and off time periods and optionally the dormant periods. The system at point 504 then estimates whether the contacted device, at a time t after the last sample has been received, is available based on the probability curve and time t.

Figure 6:
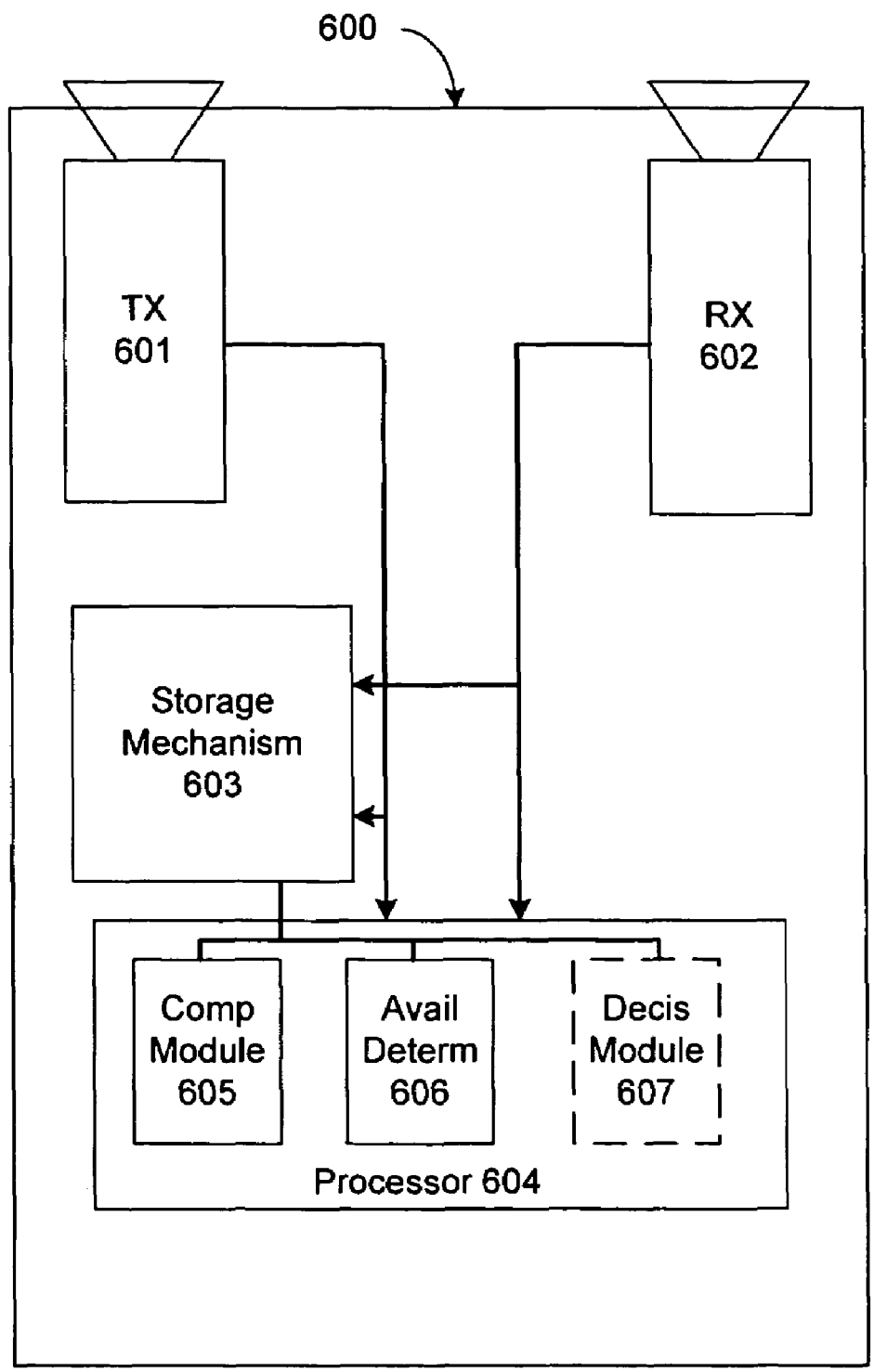
FIG. 6 illustrates an example embodiment of a system according to the present design, able to operate using either linear estimation or bin estimation availability determinations.

One embodiment of a system 600 performing in accordance with this simple linear model is illustrated in FIG. 6. All devices in the network or computing arrangement may operate the simple linear model algorithm, with each device acting as the invoking device when computing availability of available resources and/or contacted devices. From FIG. 6, transmitter 601 transmits a request for availability to a contacted device 610. Receiver 602 receives the indication that the contacted device is available or unavailable, and transmits the indication to a storage mechanism 603. Transmitter 601 and receiver 602 repeat the foregoing, storing the information received regarding availability in storage mechanism 603. Processor 604 queries storage mechanism 603 for the availability history, and computing module 605 unit computes the availability probability curve, including $p_j$ and $t_j$, based on the availability history. Availability determination module 606 applies the availability probability curve to assess the availability of the contacted device, or the probability that the contacted device is available. Optional decision module 607 determines whether one contacted device is better suited, or more likely available than other contacted devices, and may consult storage mechanism 603 for availabilities of various contacted devices.

Bin Estimation Model

The bin estimation model again presents queries from the invoking device to the contacted device and records the history of the results of such queries. The system uses assumptions regarding two events, Event B and Event A. Event B indicates that the sample is up after a time period of x from the last sample, where $t<x<t+\Delta$, and t is the current time, and $\Delta$ a predefined time "bin size." Event A indicates the sample occurs after a period of x from the last sample, where $t<x<t+\Delta$. The conditional probability P(B|A) can be estimated as the ratio of the frequency of Event B to the frequency of Event A, or:

$$P(B|A) \approx \frac{\text{count}(B)}{\text{count}(A)} \quad (5)$$

In Equation (5), the function count(.) calculates the number of elements in a set.

The system divides the estimation period into small time intervals, or bins, and estimates the probability for each bin separately. Each bin specifies a range of the time difference between two neighboring samples, and the value of the bin is determined by the percentage of the up or down samples within the bin. The system uses two tables to compute this distribution and record the number of samples in each bin, given that the previous sample is up or down. The example in FIGS. 7A and 7B illustrates the general concept of the bin estimation model embodiment.

Figures 7A, 7B:
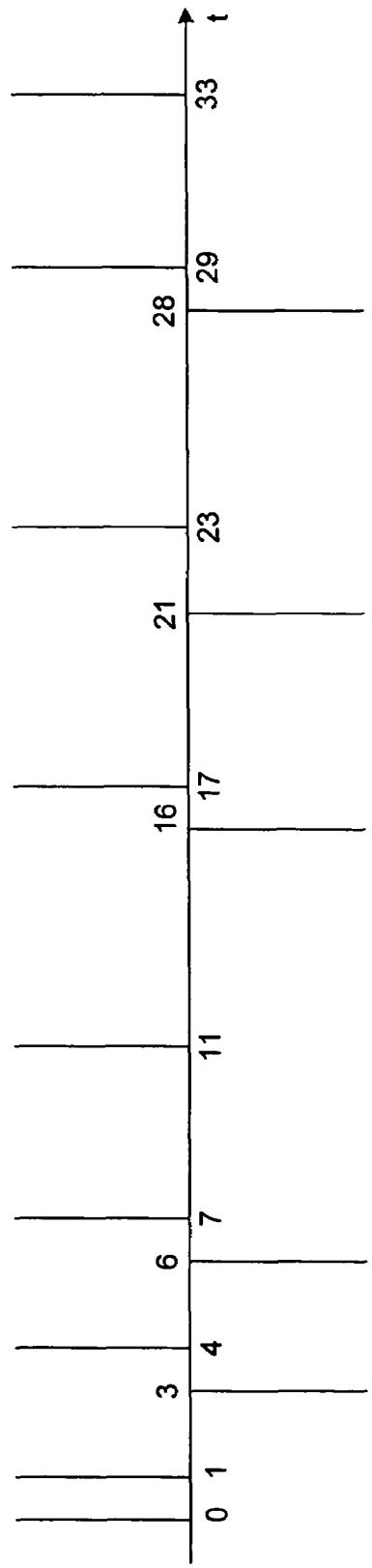
FIG. 7A shows a sequence of indications representing times that a invoking device queries a contacted device and the results of those queries.
FIG. 7B is a pair of tables used to perform bin estimation in accordance with an embodiment of the present design.

FIG. 7A shows a sequence of samples, while FIG. 7B illustrates an accompanying table for recording the sample count in each bin. The table of FIG. 7B operates assuming the previous sample is up, or that the previous sample indicated that the contacted device was available. The example of FIGS. 7A and 7B uses two bins, each having a width of 3 time units. From FIG. 7A, consider the two neighboring samples at times 0 and 1. Their separation distance is 1, therefore applicable to the first bin, where the range is one to three units of time separation. The sample at time 1 is up, so the sample at time 1 adds one occurrence of an up sample to the first bin. Similarly, the consecutive samples at times 1 and 3 fall within the first bin time period, and constitutes an occurrence of a down sample to the first bin. Another down sample occurrence for the first bin occurs for the samples at times 4 and 6. Continuing this process, the system finds that the sample pairs at times (7, 11) and (29, 33) contribute to two occurrences of up samples to the second bin, and the pairs (11, 16), (17, 21), and (23, 28) comprise the three occurrences of down samples in the second bin. The pairs (3, 4), (6, 7), (16, 17), (21, 23), and (28, 29) are occurrences recorded in a companion table where the first sample is down, or the contacted device is inactive. For example, pair (21, 23) includes sample 21, which is down, followed by sample 23, which is up, with a time separation of two units between samples, thus making up bin one in the companion table.

Figure 7C:
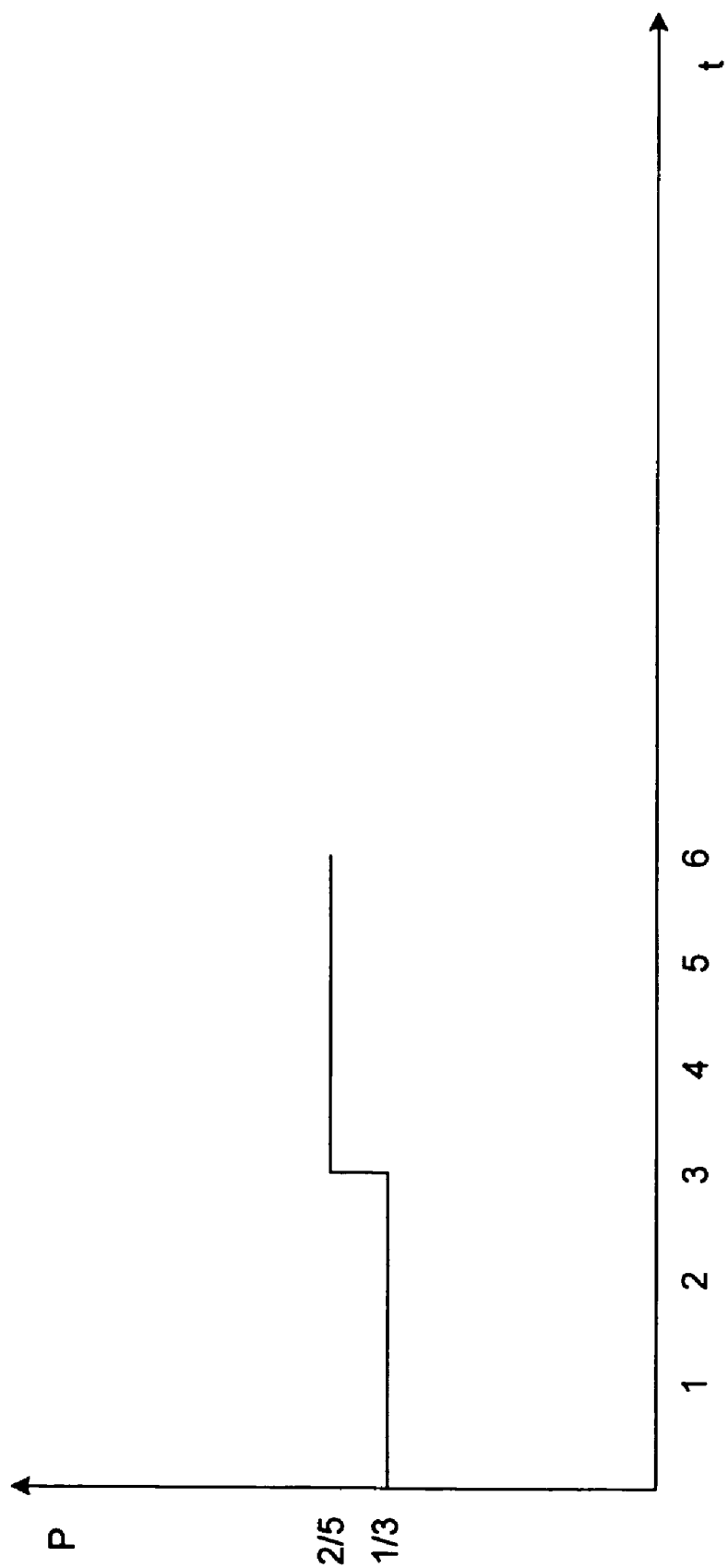
FIG. 7C shows a resultant probability curve.

Given the two tables shown in FIG. 7B, the system draws a probability curve as shown in FIG. 7C. The system may only seek the probability estimate at a single point, making constructing the entire probability curve optional. Using the probability curve of FIG. 4C, assume the system seeks to the probability that the contacted device is available at time 38. Given that the previous sample at time 33 is up, or active, and the distance 38 minus 33, or 5, falls into the second bin, the system looks up the table and compute that the probability the contacted device is active at time 38 is 2/(2+3), or 0.4.

Interpolation Enhanced Bin Estimation

A refinement of the bin estimation approach performs interpolation on the step-shaped curves generated by the system, such as the curve shown in FIG. 7C. The system can use existing linear or polynomial interpolation methods for interpolation, and interpolation can enhance prediction accuracy.

The example of FIGS. 7A-7C include only two bins. In practice, the system usually operates using significantly more bins, and the interval of the last bin extends to infinity. Bin width does not need to be uniform, and can be established based on the frequency of the sampling by the invoking device, or according to other timing associated with sampling. Narrower bins may be employed when the samples are concentrated, and the system may use wider bins when the samples are sparse. The system may have difficulty determining the bin width without prior knowledge of device behavior. To address this issue, the system applies an adaptive bin selection scheme that dynamically selects the bin widths and the number of bins.

Adaptive Bin Estimation

Adaptive bin estimation operates as follows. Given N+1 observation samples, or N neighboring sample pairs, the system seeks to divide the samples into a number of bins. The number of bins is x, and the number of samples per bin is y, equal to N/x. For simplicity, the system assumes that y is an integer. If y is not an integer, the system can round y to the nearest integer, and enable the last, or largest, bin to have less or more samples than all of the other bins. x indicates time resolution, while y indicates estimated probability resolution. To achieve a balance between these two values, the system sets x equal to $k\sqrt{N}$, so that y is equal to $(1/k)\sqrt{N}$. Using these balancing equations, both x and y increase in the presence of more samples, but increase at different rates.

The factor k may vary, but for many situations, a value of approximately 0.5 can provide satisfactory results. The value may be determined by observing overall performance or by using alternate methodology, such as establishing a value and increasing or decreasing the value based on observed performance.

One example of adaptive bin estimation is as follows. The system may have observed, for example, the result of 101 communications at times $t_1, t_2, \ldots, t_{101}$. The system sets the number of bins, x, as $0.5\sqrt{100}$, or 5. The number of samples per bin, y, is 20 in this example. The widths of these bins are not constant. The system determines bin width based on the distribution of distances between consecutive samples. The system can compute the width of each distance by allowing $d_1=t_2-t_1, d_2=t_3-t_2, \ldots, d_{100}=t_{101}-t_{100}$. The system can sort these distances from the smallest to the largest, and can obtain an ordering $d_{s1}, d_{s2}, \ldots, d_{s100}$. $d_{s1}$ represents the smallest value among $d_1, d_2, \ldots d_{100}$, and $d_{s2}$ the second smallest value, and so forth, with $d_{s100}$ representing the largest value in the range $d_1, d_2, \ldots, d_{100}$. The system divides all samples into five bins, each bin having 20 samples. The first bin covers the time interval $[0, d_{s20}]$, having a width of $d_{s20}$. The second bin covers the time interval (ds20, ds40], having a width of $d_{s40}$ minus $d_{s20}$, and so on. This division establishes the width of each bin while making the number of samples in each bin approximately the same.

For both the linear estimation and the bin estimation algorithms, the system may set a limit for the maximum number of history samples retained. The system can set this limit either directly to a fixed number M, or indirectly by keeping the samples within a fixed time interval for the time period before the latest sample. Such a limit can prevent memory usage from going to an out of bounds condition. Also, when the machine behavior changes over time, use of only the recent samples enables the algorithm to adapt to the changing behavior and achieve better estimation. If the limit is set to one sample, the algorithm reduces to recalling the state of the last sample, and employs the last sample as a gross estimation of device availability.

Figure 8:
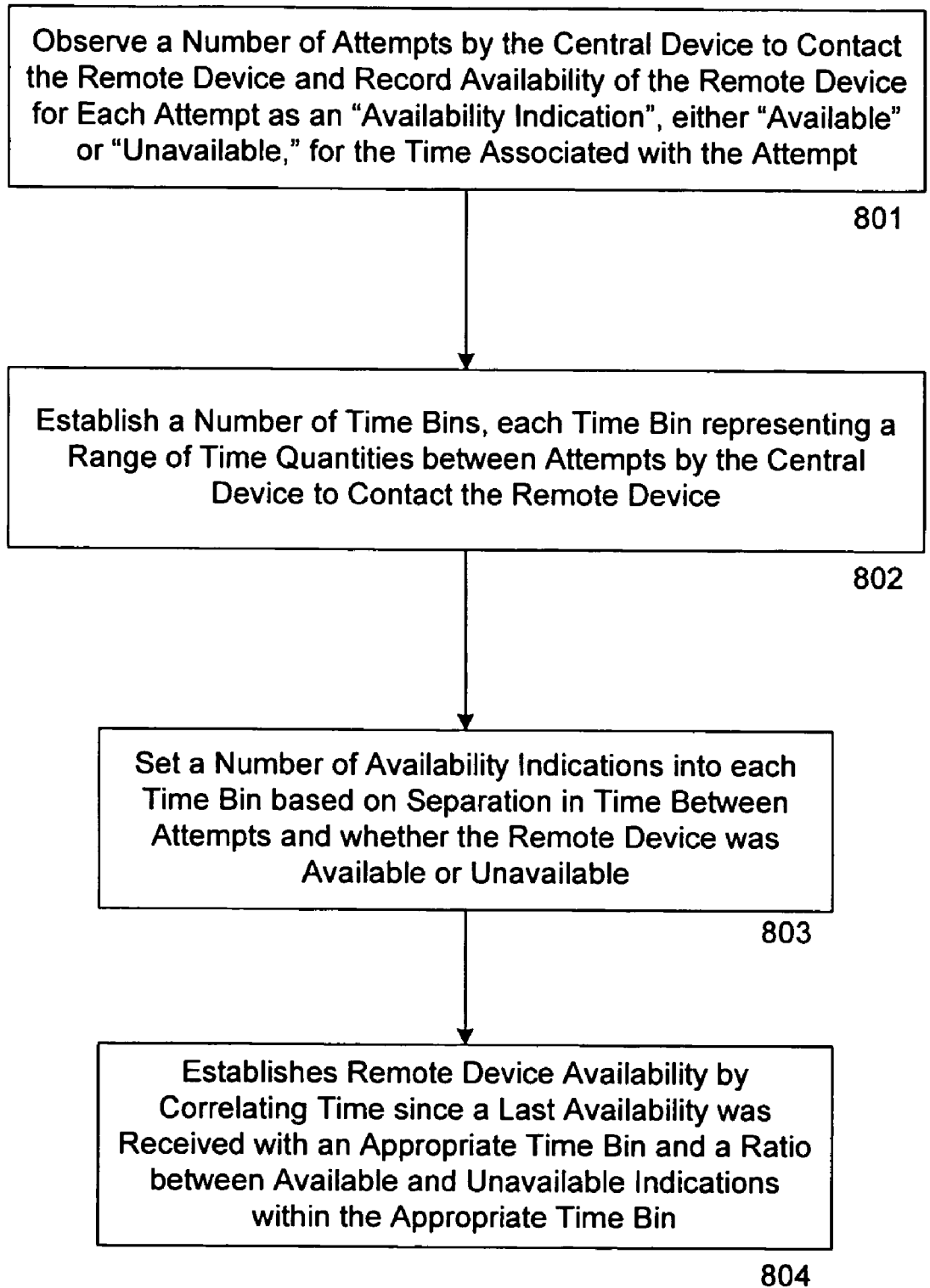
FIG. 8 is a flowchart illustrating operation of the bin estimation embodiment of the present design.

FIG. 8 shows a flowchart of the bin estimation embodiment of the present design. From FIG. 8, point 801 observes a number of attempts by the invoking device to contact the contacted device and records availability of the contacted device for each attempt as an availability indication, either "available" or "unavailable," for the time associated with the attempt. Point 802 establishes a number of time bins, each time bin representing a range of time quantities between attempts by the invoking device to contact the contacted device. For example, as shown above, the time bin can be 1-3 time units, where time units may be any type of time measurable, such as seconds, tens of seconds, hours, half hour increments, milliseconds, etc. Two sets of time bins may be employed. Point 803 sets a number of availability indications into each time bin based on separation in time between attempts and whether the contacted device was available or unavailable, such as one unit of time separation where a second attempt indicated the contacted device was available being sent to the first bin. Point 804 establishes contacted device availability by correlating time since a last availability was received with an appropriate time bin and a ratio between available and unavailable indications within the appropriate time bin. Adaptive components, including but not limited to setting number of bins and number of bins per sample based on a predetermined value, such as a constant, and the number of neighboring sample pairs, may be employed.

It will be appreciated to those of skill in the art that the present design may be applied to other systems that assess availability of components in a network, particularly those needing to predict component availability where discrete or infrequent data is available regarding each component in the network. In particular, it will be appreciated that various availability assessment schemes using prediction may be addressed by the functionality and associated aspects described herein.

Although there has been hereinabove described a system and method for estimating device availability in a pervasive peer-to-peer environment, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method for an invoking device to estimate contacted device availability in a pervasive peer-to-peer environment, comprising:
  observing a number of attempts by the invoking device to contact the contacted device and recording availability of the contacted device for each attempt as an availability indication for a time associated with the attempt;
  extrapolating at least one availability indication to at least one on period;
  computing a probability curve based on the extrapolated on period; and
  estimating whether the contacted device has availability using the probability curve.

2. The method of claim 1, wherein the estimating whether the contacted device has availability is based on a time elapsed since a latest availability indication has been received.

3. The method of claim 1, wherein computing the probability curve is based on all on periods, all off periods, and all dormant periods.

4. The method of claim 3, wherein extrapolating the at least one availability indication comprises extrapolating availability indications to at least one on period, at least one off period, and at least one dormant period.

5. The method of claim 1, wherein extrapolating at least one availability indication comprises:
  considering the contacted device to be available from a time after an indication that the contacted device is available until a subsequent availability indication; and
  considering the contacted device to be unavailable from a time after an indication that the contacted device is unavailable until a subsequent availability indication.

6. The method of claim 5, wherein computing the probability curve comprises assessing on time relative to off time, and establishing the probability curve based on the on time and a total observe time.

7. A method for an invoking device to estimate contacted device availability in a pervasive peer-to-peer environment, comprising:
  observing a number of attempts by the invoking device to contact the contacted device and recording availability of the contacted device for each attempt as an availability indication for a time associated with the attempt;
  establishing a number of time bins, each time bin representing a range of time quantities between attempts by the invoking device to contact the contacted device;
  setting a number of availability indications into each time bin based on separation in time between attempts and whether the contacted device was available or unavailable; and
  establishing contacted device availability by correlating time since a last availability was received with an appropriate time bin and a ratio between available and unavailable indications within the appropriate time bin.

8. The method of claim 7, wherein setting the number of availability indications comprises:
  establishing a quantity of positive indications corresponding to an availability indication for the time bin being available, and
  establishing a quantity of negative indications corresponding to an availability indication for the time bin being unavailable.

9. The method of claim 7, wherein establishing the number of time bins comprises establishing two sets of time bins, one set of time bins corresponding to an initial available indication, and the other set of time bins corresponding to an initial unavailable indication.

10. The method of claim 7, wherein said establishing contacted device availability comprises computing a probability curve based on time bins and ratios associated with each time bin.

11. The method of claim 10, wherein said probability curve is smoothed using linear interpolation.

12. The method of claim 10, wherein said probability curve is smoothed using polynomial interpolation.

13. The method of claim 7, wherein time bins have varying time spacing.

14. A device for estimating contacted device availability in a pervasive peer-to-peer environment, comprising:
  a transmitter configured to transmit a request for availability from the contacted device;
  a receiver receiving an availability indication for the contacted device;
  a storage mechanism for storing each time and each availability indication from the receiver, wherein a plurality of availability indications and associated times form an availability history;
  a processor for querying the storage mechanism for the availability history;
  a computing module capable of computing an availability probability curve based on the availability history; and
  an availability determination module able to apply the current time to the availability probability curve to assess the availability of the contacted device.

15. The system of claim 14, further comprising an optional decision module configured to determine whether one contacted device is more likely available than other contacted devices.

16. The system of claim 15, wherein the storage mechanism stores contacted device availability for a plurality of contacted devices, and wherein the optional decision module is configured to seek contacted device availability for a plurality of contacted devices from the storage mechanism.

17. The system of claim 14, wherein the availability determination module determines whether the contacted device has availability is based on a time elapsed since a latest availability indication has been received.

18. The system of claim 14, wherein the computing module extrapolates all availability indications to at least one on period and at least one off period, and wherein the computing module computes the availability probability curve based on relative values for all on periods and all off periods.

19. The system of claim 18, wherein computing module further extrapolates availability indications to at least one dormant period, and the computing module computes the availability probability curve based on all dormant periods.

20. The system of claim 18, wherein the computing module extrapolates all availability indications by considering the contacted device to be available from a time after an indication that the contacted device is available until a subsequent availability indication, and considering the contacted device to be unavailable from a time after an indication that the contacted device is unavailable until a subsequent availability indication.

21. A method for an invoking device to adaptively estimate contacted device availability in a pervasive peer-to-peer environment, comprising:
    observing a number of attempts by the invoking device to contact the contacted device and recording availability of the contacted device for each attempt as an availability indication for a time associated with the attempt;
    establishing a number of time bins, each time bin representing a range of time quantities between attempts by the invoking device to contact the contacted device;
    setting a number of availability indications into each time bin based on separation in time between attempts and whether the contacted device was available or unavailable, wherein said setting comprises balancing the number of time bins with the number of availability indications in each bin; and
    establishing contacted device availability by correlating time since a last availability was received with an appropriate time bin and a ratio between available and unavailable indications within the appropriate time bin.

22. The method of claim 21, wherein setting the number of availability indications comprises:
    establishing a quantity of positive indications corresponding to an availability indication for the time bin being available, and
    establishing a quantity of negative indications corresponding to an availability indication for the time bin being unavailable.

23. The method of claim 21, wherein establishing the number of time bins comprises establishing two sets of time bins, one set of time bins corresponding to an initial available indication, and the other set of time bins corresponding to an initial unavailable indication.

24. The method of claim 21, wherein said establishing contacted device availability comprises computing a probability curve based on time bins and ratios associated with each time bin.

25. The method of claim 24, wherein said probability curve is smoothed using linear interpolation.

26. The method of claim 24, wherein said probability curve is smoothed using polynomial interpolation.

27. The method of claim 21, wherein time bins have varying time spacing.

28. The method of claim 21, wherein balancing is achieved by setting both the number of time bins with the number of availability indications in each bin equal to predetermined values multiplied by a square root of a number of neighboring sample pairs.

29. The method of claim 28, wherein the number of time bins is set equal to a constant multiplied by the square root of the number of neighboring sample pairs, and the number of availability indications in each bin is set equal to an inverse of the constant multiplied by the square root of the number of neighboring sample pairs.

* * * * *

UNITED STATES PATENT AND TRADEMARK OFFICE
CERTIFICATE OF CORRECTION

PATENT NO. : 7,342,900 B2
APPLICATION NO. : 10/849999
DATED : March 11, 2008
INVENTOR(S) : Yuhong Xiong et al.

It is certified that error appears in the above-identified patent and that said Letters Patent is hereby corrected as shown below:

In column 5, line 19, delete "$t_i$" and insert -- $t_1$ --, therefor.

Signed and Sealed this

Twenty-ninth Day of July, 2008

JON W. DUDAS
*Director of the United States Patent and Trademark Office*